United States Patent
Sitter, Jr.

(10) Patent No.: US 11,640,079 B2
(45) Date of Patent: May 2, 2023

(54) BEAM SPLITTER WITH SWITCHABLE OUTPUT BEAM

(71) Applicant: Raytheon Company, Waltham, MA (US)

(72) Inventor: David N. Sitter, Jr., El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 340 days.

(21) Appl. No.: 16/937,224

(22) Filed: Jul. 23, 2020

(65) Prior Publication Data

US 2022/0026727 A1    Jan. 27, 2022

(51) Int. Cl.
G02F 1/1335    (2006.01)
G02B 27/28    (2006.01)

(52) U.S. Cl.
CPC ..... *G02F 1/133528* (2013.01); *G02B 27/283* (2013.01)

(58) Field of Classification Search
CPC .................. G02F 1/133528; G02B 27/283
USPC .......................................................... 349/96
See application file for complete search history.

(56) References Cited

U.S. PATENT DOCUMENTS

| | | | |
|---|---|---|---|
| 4,586,786 A | 5/1986 | Suzuki et al. | |
| 5,883,687 A | 3/1999 | Lu et al. | |
| 8,982,313 B2 | 3/2015 | Escuti et al. | |
| 9,658,512 B2 | 5/2017 | Tabirian et al. | |
| 9,983,479 B2 | 5/2018 | Tabirian et al. | |
| 10,191,191 B2 | 1/2019 | Tabirian et al. | |
| 10,382,700 B1 | 8/2019 | Dragavon | |
| 2002/0097355 A1* | 7/2002 | Kralik | G02F 1/31 |
| | | | 349/86 |
| 2005/0264728 A1* | 12/2005 | Funahata | G02F 1/133555 |
| | | | 349/114 |

(Continued)

FOREIGN PATENT DOCUMENTS

CN    106716238 A    5/2017
EP    0884628 A2    12/1998

(Continued)

OTHER PUBLICATIONS

Shepard, R. et al. Design Architectures for Optically Multiplexed Imaging. Optical Society of America. 2015.

(Continued)

*Primary Examiner* — Edward J Glick
*Assistant Examiner* — William D Peterson
(74) *Attorney, Agent, or Firm* — Burns & Levinson, LLP; Joseph M. Maraia

(57) ABSTRACT

A beam splitter configured to split incident light includes a polarization grating having a liquid crystal layer and a reflective sub-aperture beam splitter. The liquid crystal layer is configured to switch between an "on" state and an "off" state in response to an applied voltage. In the "off" state, the polarization grating angularly deviates and polarizes a portion of received incident light passing therethrough. In the "on" state, crystals of the polarization grating align with the incident light, allowing it to pass therethrough unimpeded and unpolarized. The beam splitter includes a plurality of sub-aperture mirrors which are spaced at randomly varying distances from one another, the mirrors being configured to reflect a portion of the incident light.

6 Claims, 5 Drawing Sheets

(56) References Cited

U.S. PATENT DOCUMENTS

2010/0231847 A1   9/2010   Escuti

FOREIGN PATENT DOCUMENTS

| WO | 9323784 | 11/1993 |
| WO | 2006092758 A2 | 9/2006 |
| WO | 2012044942 A2 | 4/2012 |

OTHER PUBLICATIONS

Chou, J. et al. Electrically Switchable Diffractive Waveplates with Metasurface Aligned Liquid Crystals. vol. 24, No. 21. Oct. 2016.
Kula, P. et al. NIR and MWIR Transparent Liquid Crystals. 2012.
Miller, N. et al. Optical Sparse Aperture Imaging. 2007.
Marrucci, L. et al. Pancharatnam-Berry Phase Optical Elements for Wave Front Shaping in the Visible Domain: Switchable Helical Mode Generation. 2006.
Nersisyan, S. et al. Polarization Insensitive Imaging Through Polarization Gratings. vol. 17, No. 3. Feb. 2009.
Mahalanobis, A. et al. Recent Results of Medium Wave Infrared Compressive Sensing. Nov. 2014.
Shah, V. et al. Shift-Encoded Optically Multiplexed Imaging. Spie. Apr. 2017.
Tabiryan, N. et al. The Promise of Diffractive Waveplates. Mar. 2010.

\* cited by examiner

BEAM SPLITTER WITH SWITCHABLE OUTPUT BEAM

STATEMENT OF GOVERNMENT SUPPORT

This invention was made with government support under Contract No. N00014-18-C-1038. The U.S. Government has certain rights in the invention.

FIELD

The subject disclosure relates to beam splitters, and more particularly to beam splitters utilizing a polarization grating.

BACKGROUND

There are a variety of applications, such as image projectors and scene generators, that require a spatial light modulator under computer control. Unfortunately, there are few such devices that are light efficient and fewer that can operate at infrared wavelengths. In addition, there are new applications such as optical multiplexing that need beam splitters that can be modulated or "switched" between states. Liquid crystal devices and digital micro-mirror devices exist which can be used as a spatial light modulator. These devices are used in visible image projectors, but are not able to be used as a beam splitter or in the pupil plane. Thus, there is a need for spatial light modulators for electronically controlled image display and switching applications which can act as a beam splitter.

SUMMARY

In light of the needs described above, the subject technology combines an electronically controlled polarization grating with sub-aperture mirrors to produce a beam splitter that can be switched from a normal operation to a diverted state where the light in one of the paths can be directed to a beam dump, such as a cold plate. The mirrors are randomized spatially in a sparse distribution over a transmissive substrate such that a sparse aperture beam splitter is created. In normal beam splitting operation, light intercepted by the mirrors is reflected, while the light missing the reflectors is transmitted. An electronically controlled polarization grating is located in either the reflective or transmissive path. In normal beam splitting operation, the polarization grating does not introduce optical deviation or polarization modulation of the optical beams. A change in the electrical biasing of the polarization grating causes the beam in its path to be angularly deviated or "switched" out of the normal imaging path.

In at least one aspect, the subject technology relates to a beam splitter configured to split incident light. The beam splitter includes a polarization grating and a plurality of sub-aperture mirrors. The polarization grating has a liquid crystal layer configured to switch from an "off" state to an "on" state in response to an applied voltage, the applied voltage aligning a crystal axis of the liquid crystal layer with an optical axis of the incident light to allow the incident light to pass therethrough unimpeded. The sub-aperture mirrors are configured to reflect the incident light, the sub-aperture mirrors spaced at randomly varying distances from one another. When the polarization grating is in the "off" state, the liquid crystal layer is configured to polarize the incident light as it passes therethrough.

In some embodiments, the polarization grating includes a first side and a second side opposite the first side, the crystal axis running between, and orthogonal to, the first side and the second side when the polarization grating is in the "on" state. The liquid crystal layer is configured to allow the incident light to pass from the first side to the second side unimpeded when in the "on" state. In some cases, the sub-aperture mirrors are positioned on the first side of the polarization grating to reflect the incident light before the incident light passes through the polarization grating. In some cases, the sub-aperture mirrors are positioned on the second side of the polarization grating to reflect the incident light after the incident light has passed through the polarization grating such that reflected light returns through the polarization grating. In some embodiments, the liquid crystal layer is formed from a plurality of separated crystal layer segments, each crystal layer segment aligning with one of the sub-aperture mirrors along the optical axis. The polarization grating includes a plurality of transparent substrates between the liquid crystal layer segments, the transparent substrates allowing the incident light to pass from the first side to the second side unimpeded.

In some embodiments, a first transparent substrate is positioned on the first side of the polarization grating. A second transparent substrate is positioned on the second side of the polarization grating. A first transparent electrode is positioned between the first side of the polarization grating and the first transparent substrate. A second transparent electrode is positioned between the second side of the polarization grating and the second transparent substrate. The first transparent electrode and the second transparent electrode are configured to selectively provide the applied voltage.

In at least one aspect, the subject technology relates to a beam splitter configured to split incident light with a polarization grating, transparent substrates, electrodes, and sub-aperture mirrors. The polarization grating has a first side, a second side opposite the first side, and a liquid crystal layer between the first side and the second side. The polarization grating is configured to switch from an "off" state to an "on" state in response to an applied voltage, the applied voltage aligning a crystal axis of the liquid crystal layer with an optical axis of the incident light to allow the incident light to pass therethrough unimpeded. A first transparent substrate is positioned on the first side of the polarization grating. A second transparent substrate is positioned on the second side of the polarization grating. A first transparent electrode is positioned between the first side of the polarization grating and the first transparent substrate. A second transparent electrode is positioned between the second side of the polarization grating and the second transparent substrate. A plurality of sub-aperture mirrors are attached to the first transparent substrate and positioned at randomly varying distances from one another, the sub-aperture mirrors configured to reflect the incident light. When the polarization grating is in the "off" state, the liquid crystal layer is configured to polarize the incident light as it passes therethrough. The first transparent electrode and the second transparent electrode are configured to selectively provide the applied voltage.

In at least one aspect, the subject technology relates to a beam splitter configured to split incident light. The beam splitter has a polarization grating, transparent substrates, transparent electrodes, and sub-aperture mirrors. The polarization grating has a first side, a second side opposite the first side, and a plurality of separated liquid crystal layer segments forming a crystal layer between the first side and the second side, the polarization grating configured to switch from an "off" state to an "on" state in response to an applied voltage, the applied voltage aligning the crystal axis of the liquid crystal layer with an optical axis of the incident light to allow the incident light to pass therethrough unimpeded. A first transparent substrate is positioned on the second side of the polarization grating. A first transparent electrode positioned on the first side of the polarization grating. A second transparent electrode positioned between the second side of the polarization grating and the first transparent substrate. A plurality of sub-aperture mirrors are attached to the first transparent substrate and positioned at randomly varying distances from one another, the sub-aperture mirrors configured to reflect the incident light after the incident light has passed through the polarization grating such that the incident light returns through the polarization grating. Each liquid crystal layer segment aligns with one of the sub-aperture mirrors along the optical axis. The polarization grating includes a plurality of second transparent substrates between the liquid crystal layer segments, the second transparent substrates allowing incident light to pass from the first side to the second side unimpeded. When the polarization grating is in the "off" state, the liquid crystal layer is configured to polarize the incident light as it passes therethrough. The first transparent electrode and the second transparent electrode are configured to selectively provide the applied voltage.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
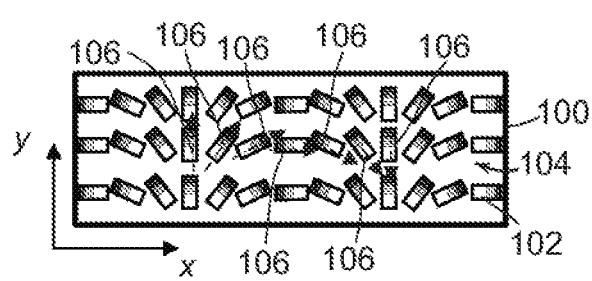
FIG. 1 is a front view of a polarization grating in an "off" state.

The subject technology overcomes many problems associated with prior art spatial light modulators. In brief summary, the subject technology provides a beam splitter that can split incident light into multiple beams and a method to deviate or "switch" one of the beams using an electronically biased polarization grating. The advantages, and other features of the systems and methods disclosed herein, will become more readily apparent to those having ordinary skill in the art from the following detailed description of certain preferred embodiments taken in conjunction with the drawings which set forth representative embodiments of the present disclosure. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Figure 2B:
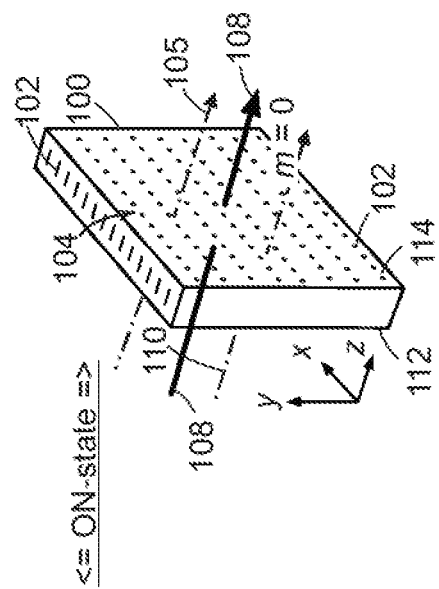
FIG. 2b is a side perspective view of the polarization grating of FIG. 1 in an "on" state where the incident optical beam is undeviated and the polarization state is unchanged.
Figure 2A:
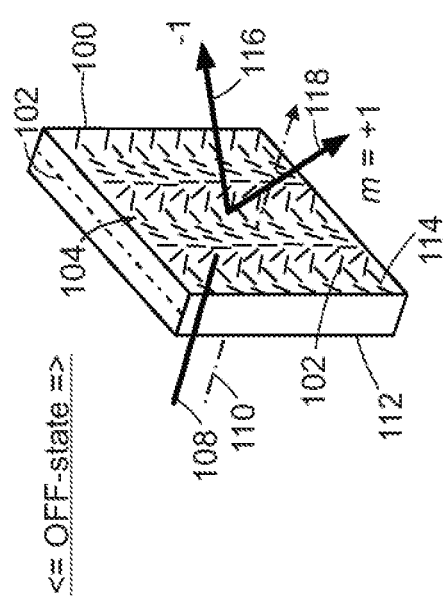
FIG. 2a is a side perspective view of the polarization grating of FIG. 1 in the "off" state where the incident optical beam is deviated and the polarization state is modified.
Figure 3:
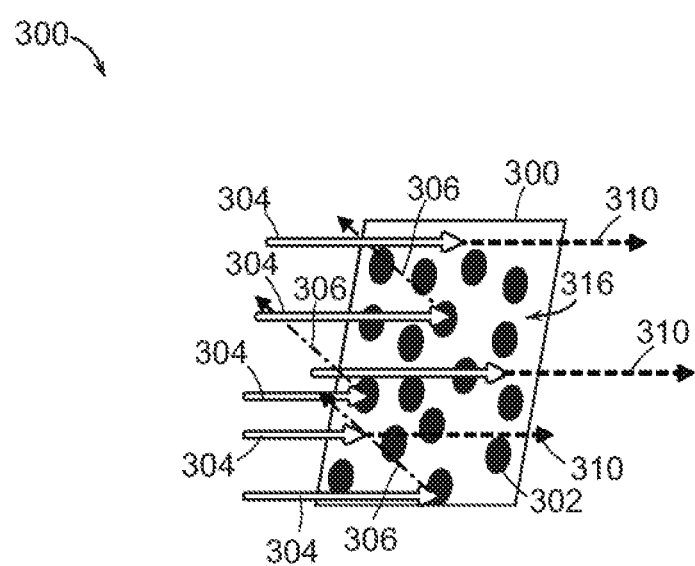
FIG. 3 is a front perspective view of a beam splitter illustrating the random distribution of sub-aperture reflectors in accordance with the subject technology.

Referring now to FIGS. 1-3, a polarization grating 100 is shown. In particular, FIGS. 1-2a show the polarization grating 100 in an "off" state where the incident optical beam is angularly deviated and polarized. FIG. 2b shows the polarization grating in an "on" state where the incident beam is undeviated and its polarization state is unchanged after a voltage has been applied to the polarization grating. The polarization grating 100 can be integrated as part of a beam splitter in accordance with the subject technology, as discussed in more detail herein.

The polarization grating 100 includes a plurality of liquid crystals 102 forming thin layer of liquid crystal material (i.e. a liquid crystal layer 104). Initially, the liquid crystals 102 are aligned so that they rotate across the polarization grating 100 in a linear fashion. The direction of the rotation of the crystal axis 106 is depicted. This effectively creates a waveplate with an axis that rotates laterally spatially. Incident light 108, which is typically unpolarized light from an external source (not shown distinctly), is directed to the polarization grating 100 along an optical axis 110. The incident light 108 enters the polarization grating 100 through a first side 112, passing through the polarization grating 100 with the output beam existing the second side 114. As the incident light 108 strikes the crystals 102 in the "off" state of FIG. 2a, the incident light 108 is diffracted, changing the path of the light off of the optical axis 110 and splitting the output beam into two different paths 116, 118.

The liquid crystals 102 are configured to rotate in response to an applied voltage across the liquid crystal layer 104. FIG. 2b shows the orientation of the liquid crystals 102 in the "on" state, after the voltage has been applied. In the "on" state, the crystals 102 are rotated by the electric field such that the crystal axis 106 aligns with, and is parallel to, the optical axis 110 of the incident light 108. Therefore light can pass through the polarization grating 100, from the first side 112 to the second side 114, undeviated and with no change in polarization of the incident light 108 (e.g. the incident light 108 remaining unpolarized).

Figures 4, 5:
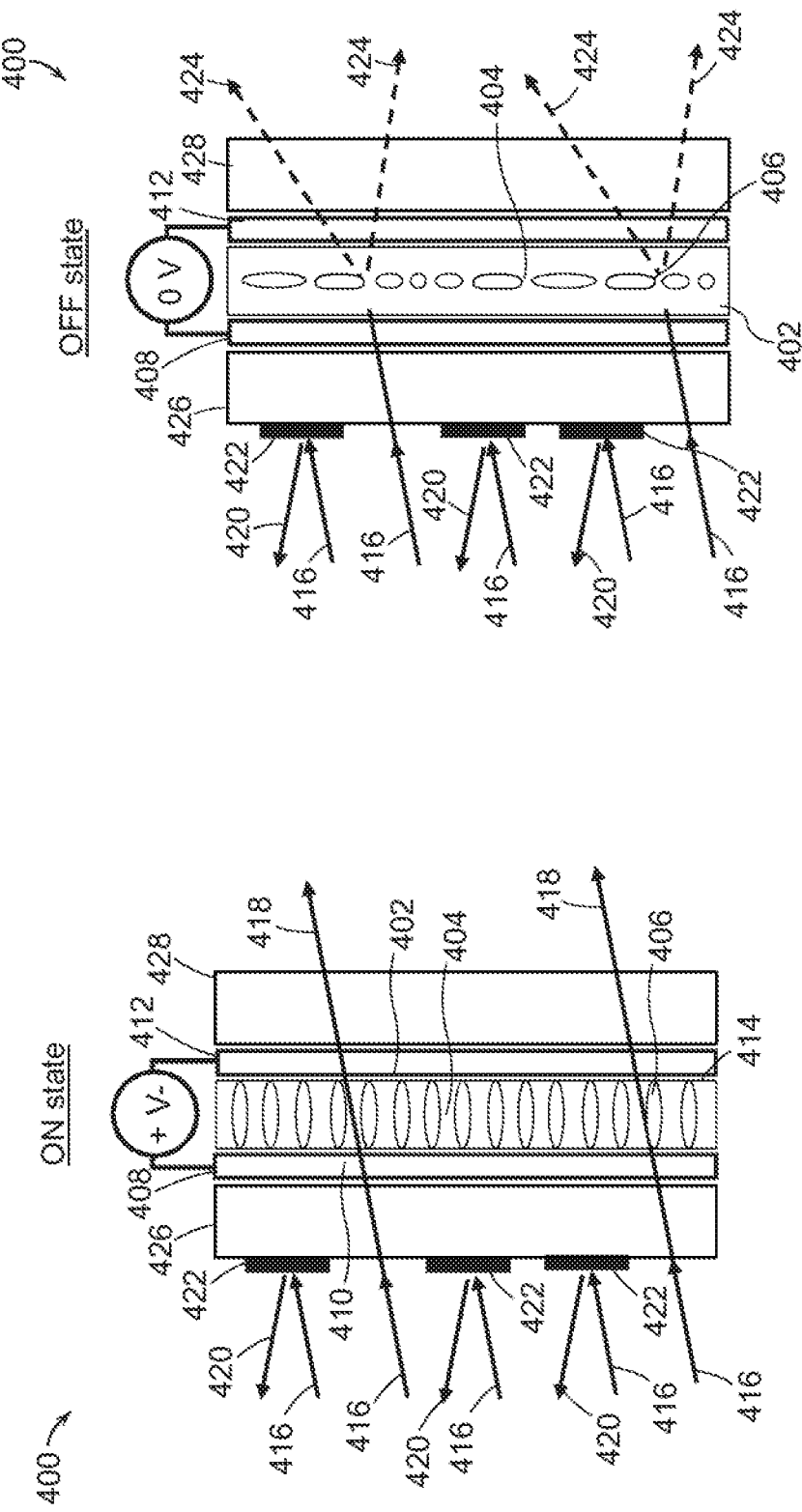
FIG. 4 is a side view of a first embodiment of a beam splitter with a polarization grating located in the transmissive path and in an "on" state in accordance with the subject technology.
FIG. 5 is a side view of the beam splitter of FIG. 4 with a polarization grating in the transmissive path and in an "off" state in accordance with the subject technology.
Figure 7:
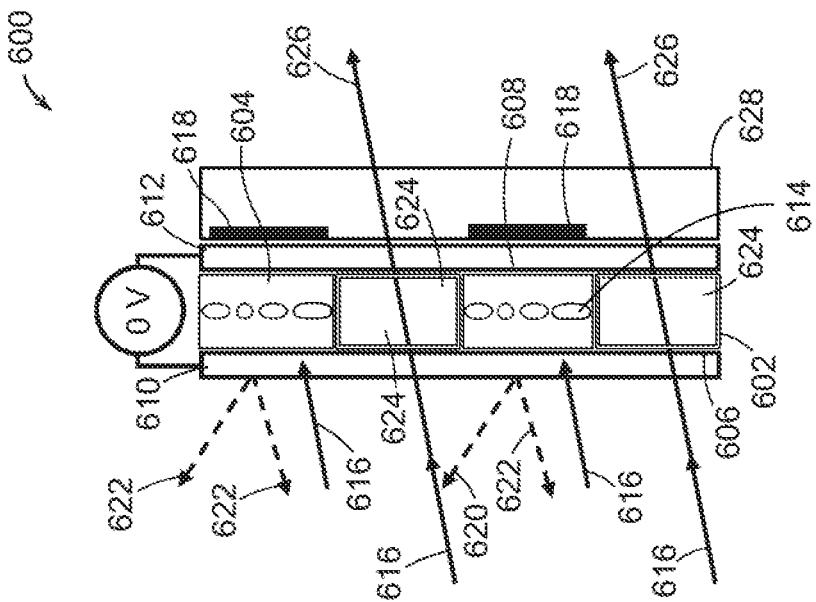
FIG. 7 is a side view of the beam splitter of FIG. 6 with a polarization grating in the reflective path and in an "off" state in accordance with the subject technology.
Figure 6:
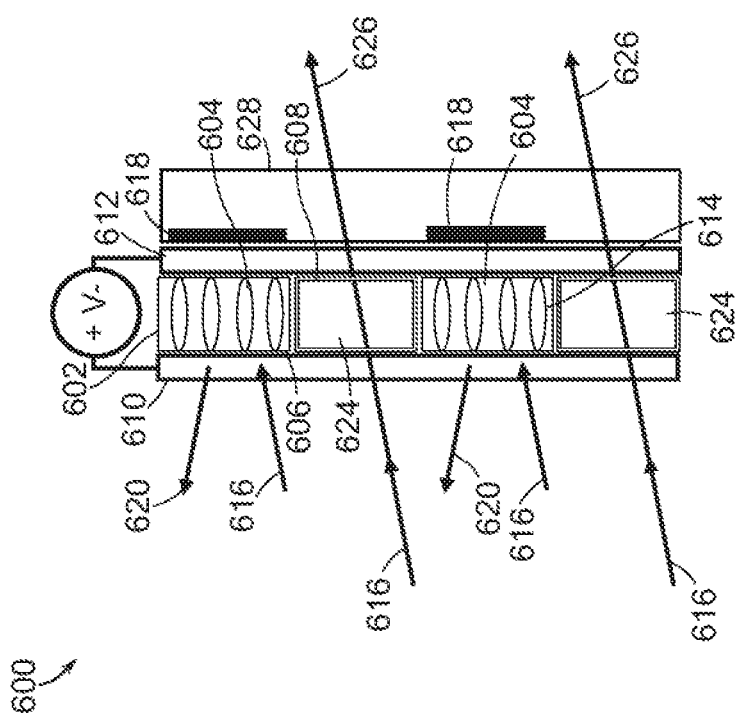
FIG. 6 is a side view of a second embodiment of a beam splitter with a polarization grating in the reflective path and in an "on" state in accordance with the subject technology.

Referring now to FIGS. 3-7, exemplary embodiments of a polarization grating 300 and beam splitters 400, 600, configured in accordance with the subject technology, are shown. In particular, FIG. 3 shows an exemplary perspective view of the beam splitter assembly 300, with certain components of the beam splitter omitted for clarity. FIGS. 4-5 show side views of a first embodiment of a beam splitter 400 in accordance with the subject technology. FIGS. 6-7 show side views of a second embodiment of a beam splitter 600 in accordance with the subject technology.

Referring now to FIG. 3, the polarization grating 100 shown can be part of a beam splitter, and can be configured similarly to the polarization grating 100, except as otherwise shown and described. In particular, the polarization grating 300 includes a plurality of sub-aperture reflective mirrors 302 randomly distributed over the polarization grating 300.

The mirrors 302 can be attached on one side of the polarization grating 300 via a separate medium (not distinctly shown). For example, in some embodiments the reflective mirrors 302 are fabricated directly on a transmissive, transparent substrate. The mirrors 302 have a reflective surface to redirect light 304 away from the mirror 302, sending reflected light 306 back in the general direction from which the light 304 was originally transmitted. In the area 316 in between the reflective mirrors, the surface of the polarization grating 300 can be covered with a transparent anti-reflective coating. Light 310 passing in the area 316 between the mirrors 302 can then leave the polarization grating 300 as an output beam (i.e. output light 310). It should be noted that the dimensions and number of mirrors 302 shown in FIG. 3 is presented for clarity of illustration only. One skilled in the art would understand that in practice, the polarization grating 300 may include many more mirrors 302 than shown in FIG. 3, and the size and spacing may vary differently than shown. In general, a sub-aperture dimension can be utilized that is much longer than the longest wavelength to minimize the diffraction effect. The sub-aperture mirror 302 size may also be much smaller than the beam print on the optical element utilized to maximize the redundancy of the spatial frequency sampling (i.e. a "dense" aperture array as opposed to a "sparse" aperture array).

Referring now to FIGS. 4-5, a beam splitter 400 configured to split incoming light. FIG. 4 shows the beam splitter 400 in the "on" state, while FIG. 5 shows the beam splitter 400 in the "off" state. The beam splitter 400 can be controlled, and selectively changed between the "on" state and the "off" state, by an external computer, not shown distinctly herein. The beam splitter 400 includes a polarization grating 402 which can be configured similar to the polarization grating 300, except as otherwise shown and described. The polarization grating 402 has a liquid crystal layer 404, formed from a plurality of liquid crystals 406. A first transparent electrode 408 is positioned directly adjacent to a first side 410 of the polarization grating 402, while a second transparent electrode 412 is positioned directly adjacent to a second side 414 of the polarization grating 402. The electrodes 408, 412 are configured to selectively provide a voltage that is applied to the polarization grating 402. When applied, the voltage activates the polarization grating 402 into the "on" state, causing the crystal axis of the liquid crystal layer 404 to align (generally) with the optical axis of the incident light 416 such that a portion of the incident light 416 can pass through the polarization grating 402 unimpeded, as shown by output light 418 in FIG. 4. In the "off" state shown in FIG. 5, the crystal axis is no longer aligned with the optical axis of the incident light 416 (e.g. as shown in FIGS. 2a-2b), and therefore the portion of the incident light 416 passing through the polarization grating 402 is diffracted into multiple output paths 424.

Similar to the polarization grating 300, the polarization grating 402 includes a plurality of sub-aperture reflective mirrors 422 positioned at randomly varying distances on a first side 410 of the polarization grating 402. A portion of the incident light 416 contacts the sub-aperture reflective mirrors 422 and is returned in the general direction that the incident light 416 originated from (as reflected light 420), never passing through the polarization grating 402. Thus, in the "on" state, if the original incident light 416 is unpolarized, the unimpeded light 418 and reflected light 420 will be unpolarized. By contrast, in the "off" state, only the reflected light 420 will remain be unpolarized. The distribution of the sub-aperture reflective mirrors 422 gives a specified fractional coverage which defines the beam splitting ratio. The randomly varying distribution suppresses diffraction peaks of the reflected light 420 and the unimpeded light 418.

Therefore the beam splitter 400 provides a switchable mirror device which combines a polarization grating 402 with sub-aperture mirrors 422 which can be switched from a normal beam splitting operation to a diverted state where the light can be directed to a beam dump such as a cold plate. The beam splitter 400 can be used for controlled beam splitting in many applications, including image projection and the like.

The beam splitter 400 can also include two transparent substrates 426, 428 which act to provide structural stability to the beam splitter 400. For example, the sub-apertures mirrors 422 can be fabricated directly onto a first transparent substrates 426. The first transparent substrate 426 is positioned on the first side 410 of the polarization grating 402, in contact with the outer side of the first electrode 408. The second transparent substrate 428 is positioned on the second side 414 of the polarization grating 402, in contact with the outer side of the second electrode 412. Thus, electrodes 408, 412 are seated between the polarization grating 402 and respective transparent substrates 426, 428. In the example shown, the sub-aperture mirrors 422 are held in place by the first transparent substrate 426, and are positioned on the front side of the first transparent substrate 426 (i.e. the side receiving the incident light 416). This allows the incident light 416 to be reflected, and split, prior to passing through the polarization grating 402.

Referring now to FIGS. 6-7, another embodiment of a beam splitter 600 is shown. FIG. 6 shows the beam splitter 600 in an "on" state, while FIG. 7 shows the beam splitter 600 in the "off" state. The beam splitter 600 can be configured similar to the beam splitter 400, except as otherwise shown and described.

The beam splitter 600 has a polarization grating 602 which includes a liquid crystal layer 604 between a first side 606 and a second side 608. Each side 606, 608 is adjacent to a transparent electrode 610, 612, the transparent electrodes 610, 612 being configured to apply a voltage to the polarization grating 602 to turn the polarization grating 602 from the "off" state to the "on" state. In the "on" state, the crystal axis of crystals 614 of the liquid crystal layer 604 aligns generally with the optical axis of the incident light 616 received by the beam splitter 600, allowing a portion of the incident light 616 to pass through unimpeded.

The beam splitter 600 includes reflective sub-aperture mirrors 618 that are deposited on a transparent substrate 628 and spaced at randomly varying distances. In contrast to the sub-aperture mirrors 422 of the beam splitter 400, the mirrors 618 of the beam splitter 600 are positioned on the second side 608 of the polarization grating 602, opposite the side 606 through which the incident light 616 initially enters the polarization grating 602. This results in the mirrors 618 only reflecting 620, 622 that has passed through the polarization grating 602. Similarly, after reflecting off the mirrors 618, the reflected light 620, 622 is directed back through the polarization grating 602, in the general direction from which the incident light 616 was received.

The liquid crystal layer 604 of the polarization grating 602 is defined by a number of separate segments. Each segment of the liquid crystal layer 604 aligns generally with one of the sub-aperture mirrors 618, such that the incident light 616 passes through the corresponding crystal layer 604 segment before reflecting off the corresponding sub-aperture mirror 618 and returning through the same segment. The polarization grating 602 also includes a number of transparent substrates 624 which fill the space between the liquid crystal layer 604 segments. Portions of the transmitted light 626 which are transmitted through the transparent substrate 624 will pass through the polarization grating 602 along the optical axis of the incident light 616 unimpeded (and remaining unpolarized, if the incident light 616 is unpolarized). Thus the beam splitter 600 is able to allow a portion of the incident light 616 to pass through unimpeded, and can be selectively be turned "on" or "off" to allow a reflected portion of the light 620, 622 to be reflected as either unimpeded (e.g. unpolarized) or angularly deviated and polarized. When the polarization grating 602 is in the "off" state, the polarized reflected light will therefore be split into separate polarized beams 622 which are directed generally back in the direction of the originally incident light 616.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A beam splitter configured to split incident light comprising:
   a polarization grating having a liquid crystal layer configured to switch from an "off" state to an "on" state in response to an applied voltage, the applied voltage aligning a crystal axis of the liquid crystal layer with an optical axis of the incident light to allow the incident light to pass therethrough unimpeded;
   the polarization grating including a first side and a second side opposite the first side, the crystal axis running between, and orthogonal to, the first side and the second side when the polarization grating is in the "on" state;
   the liquid crystal layer being configured to allow the incident light to pass from the first side to the second side unimpeded when in the "on" state; and
   a plurality of sub-aperture mirrors configured to reflect the incident light, the sub-aperture mirrors spaced at randomly varying distances from one another,
   wherein when the polarization grating is in the "off" state, the liquid crystal layer is configured to polarize the incident light as it passes therethrough; and
   wherein the plurality of sub-aperture mirrors are positioned on the second side of the polarization grating to reflect the incident light after the incident light has passed through the polarization grating such that reflected light returns through the polarization grating.

2. The beam splitter of claim 1, wherein the sub-aperture mirrors are positioned on the first side of the polarization grating to reflect the incident light before the incident light passes through the polarization grating.

3. The beam splitter of claim 1, wherein the liquid crystal layer is formed from a plurality of separated crystal layer segments, each crystal layer segment aligning with one of the sub-aperture mirrors along the optical axis; and
   the polarization grating includes a plurality of transparent substrates between the liquid crystal layer segments, the transparent substrates allowing the incident light to pass from the first side to the second side unimpeded.

4. The beam splitter of claim 1, further comprising:
   a first transparent substrate positioned on the first side of the polarization grating;
   a second transparent substrate positioned on the second side of the polarization grating;
   a first transparent electrode positioned between the first side of the polarization grating and the first transparent substrate; and
   a second transparent electrode positioned between the second side of the polarization grating and the second transparent substrate,
   wherein the first transparent electrode and the second transparent electrode are configured to selectively provide the applied voltage.

5. A beam splitter configured to split incident light comprising:
   a polarization grating having a first side, a second side opposite the first side, and a liquid crystal layer between the first side and the second side, the polarization grating configured to switch from an "off" state to an "on" state in response to an applied voltage, the applied voltage aligning a crystal axis of the liquid crystal layer with an optical axis of the incident light to allow the incident light to pass therethrough unimpeded;
   the polarization grating including a first side and a second side opposite the first side, the crystal axis running between, and orthogonal to, the first side and the second side when the polarization grating is in the "on" state;
   the liquid crystal layer being configured to allow the incident light to pass from the first side to the second side unimpeded when in the "on" state;
   a first transparent substrate positioned on the first side of the polarization grating;
   a second transparent substrate positioned on the second side of the polarization grating;
   a first transparent electrode positioned between the first side of the polarization grating and the first transparent substrate;
   a second transparent electrode positioned between the second side of the polarization grating and the second transparent substrate; and
   a plurality of sub-aperture mirrors attached to the first transparent substrate and positioned at randomly varying distances from one another, the sub-aperture mirrors configured to reflect the incident light, wherein:
   when the polarization grating is in the "off" state, the liquid crystal layer is configured to polarize the incident light as it passes therethrough;
   the first transparent electrode and the second transparent electrode are configured to selectively provide the applied voltage; and
   the plurality of sub-aperture mirrors are positioned on the second side of the polarization grating to reflect the incident light after the incident light has passed through the polarization grating such that reflected light returns through the polarization grating.

6. A beam splitter configured to split incident light comprising:

a polarization grating having a first side, a second side opposite the first side, and a plurality of separated liquid crystal layer segments forming a crystal layer between the first side and the second side, the polarization grating configured to switch from an "off" state to an "on" state in response to an applied voltage, the applied voltage aligning the crystal axis of the liquid crystal layer with an optical axis of the incident light to allow the incident light to pass therethrough unimpeded;

a first transparent substrate positioned on the second side of the polarization grating;

a first transparent electrode positioned on the first side of the polarization grating;

a second transparent electrode positioned between the second side of the polarization grating and the first transparent substrate; and a plurality of sub-aperture mirrors attached to the first transparent substrate and positioned at randomly varying distances from one another, the sub-aperture mirrors configured to reflect the incident light after the incident light has passed through the polarization grating such that the incident light returns through the polarization grating, wherein:

each liquid crystal layer segment aligns with one of the sub-aperture mirrors along the optical axis;

the polarization grating includes a plurality of second transparent substrates between the liquid crystal layer segments, the second transparent substrates allowing incident light to pass from the first side to the second side unimpeded;

when the polarization grating is in the "off" state, the liquid crystal layer is configured to polarize the incident light as it passes therethrough; and the first transparent electrode and the second transparent electrode are configured to selectively provide the applied voltage.

* * * * *